United States Patent [19]
Gotoh et al.

[11] Patent Number: 5,734,920
[45] Date of Patent: Mar. 31, 1998

[54] INPUT/OUTPUT PROCESSING IC

[75] Inventors: Yoshinori Gotoh; Kenji Murakami, both of Kariya; Tadashi Shibata, Toyokawa; Shunji Kamei, Nagoya; Hajime Nomura, Okazaki, all of Japan

[73] Assignee: Nippondenso Co., Ltd., Kariya, Japan

[21] Appl. No.: 835,907

[22] Filed: Jan. 10, 1997

Related U.S. Application Data

[63] Continuation of Ser. No. 266,461, Jun. 27, 1994, abandoned.

[30] Foreign Application Priority Data

Jun. 28, 1993 [JP] Japan ................................. 5-184537
Jun. 30, 1993 [JP] Japan ................................. 5-188980

[51] Int. Cl.$^6$ ............................................. G06F 7/00
[52] U.S. Cl. .................. 395/800; 395/825; 364/232.8; 364/238.3; 364/260.4; 364/DIG. 1
[58] Field of Search ...................... 395/200.05, 200.08, 395/200.18, 825, 828, 835, 842, 285, 421.09, 800, 868, 872, 885, 733

[56] References Cited

FOREIGN PATENT DOCUMENTS

| | | |
|---|---|---|
| 380689 | 8/1991 | Japan . |
| 523645 | 3/1993 | Japan . |
| 589256 | 4/1993 | Japan . |

Primary Examiner—Alpesh M. Shah
Attorney, Agent, or Firm—Cushman, Darby & Cushman IP Group of Pillsbury Madison & Sutro LLP

[57] ABSTRACT

A compact input/output processing IC, which reduces the CPU load, to which microcomputer 100, input/output processing IC 200, and various inputs and outputs are connected. Parallel signals are connected to a high-speed input/output buffer and serial signals are connected from communications control circuit 207 via serial communications circuit 206 to SIO 104. To achieve the proper control, data requiring high speed is handled by parallel communications. Serial communications is handled by shift registers, first bit of each being connected to the last bit of the other, to form a loop, with instruction and input/output data from the CPU exchanged simultaneously, thereby achieving efficient processing. This achieves better organization of the communications for input/output processing, enabling both better control and a compact hardware design.

10 Claims, 12 Drawing Sheets c: PARALLEL INPUT DATA IS HELD AND TRANSFERRED TO THE SHIFT REGISTER.
d: SERIAL DATA IS HELD AND TRANSFERRED FROM THE SHIFT REGISTER TO THE OUTPUT BUFFER.

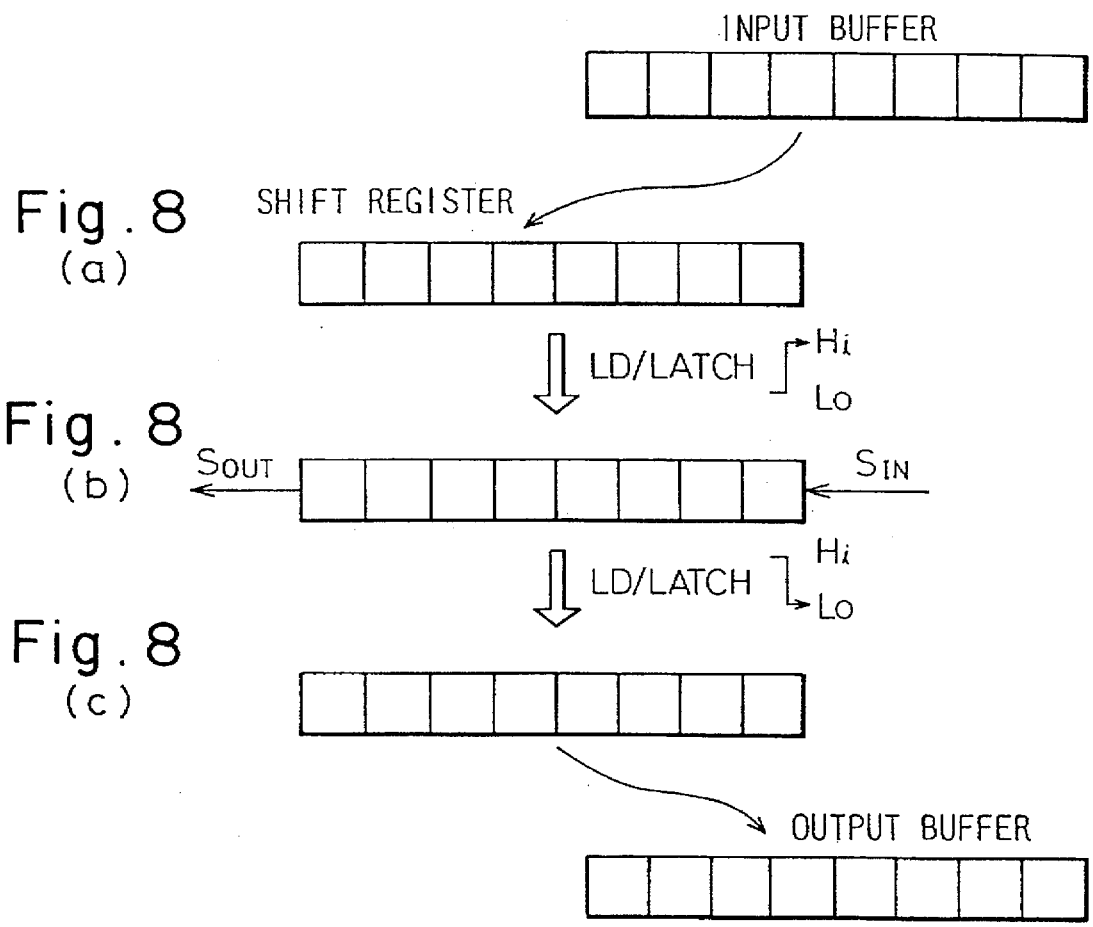

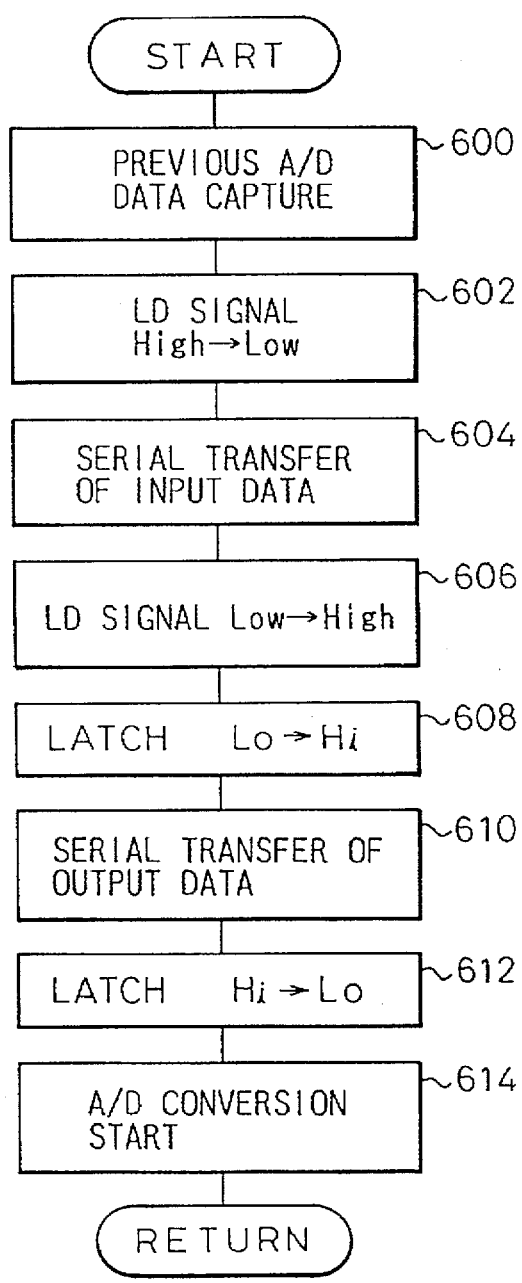
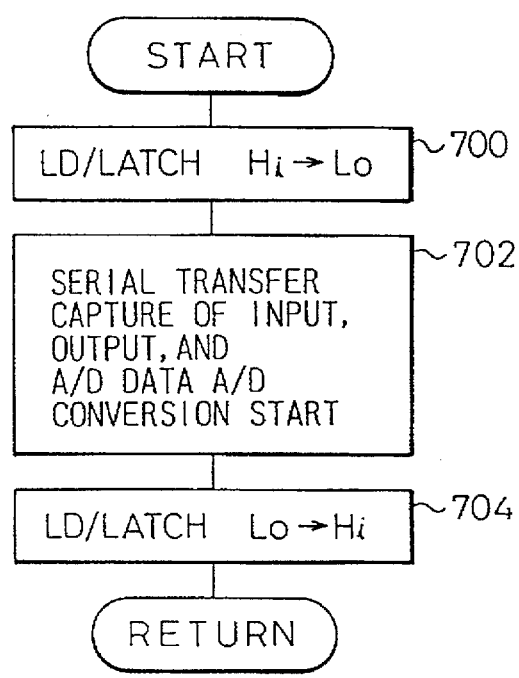

INPUT/OUTPUT PROCESSING IC

This is a continuation of application Ser. No. 08/266,461, filed on Jun. 27, 1994, now abandoned.

BACKGROUND OF THE INVENTION

1. Field of the Invention

The present invention is related to an electronic control unit which offers high-speed data processing and which is used in applications such as vehicle engine control, and more specifically it relates to an input/output processing IC which is controlled by a microcomputer.

2. Description of the Related Art

With an increased awareness with regard to environmental protection in recent years, there has been a worldwide demand for both cleaner vehicle exhaust emissions and improved fuel consumption, creating a need to perform more accurate engine control. Because this is focused on the engine control unit (ECU), it leads to microcomputer implementation of ECUs in which not only is connection made to a variety of sensors to determine the status of the engine and surround system but also computer control is performed of a variety of actuators quite complex control is performed. However, in the past either dedicated input/output ICs were fabricated separately or a general purpose IC was used in a board-mounted system with connections to the CPU and other elements, thereby requiring a considerable amount of board space. For that reason, efforts have been made to make the ECU compact, by means of hybrid IC or monolithic IC implementations.

However, because the ICs for the purpose of I/O processing include separate ICs for input, output, and even for analog and digital input signal ICs, the CPU is repaired to have separate corresponding programs for each of these ICs and for data manipulation as well. For example, execution of a program to send data is followed by execution of a program to receive data, increasing the load on the CPU and making it difficult to maintain the speed of engine control and other functions. In addition, the use of individual ICs requires connections between these ICs on the board, thereby presenting a limitation in the degree of compactness that is achievable.

For example, FIG. 12 shows the configuration of a prior art example, in which the A/D converter, digital input, and digital output and other microcomputer peripheral ICs are fabricated as separated devices, with signal lines for each located in the area of the board surrounding the microcomputer CPU. These ICs are often designed and manufactured separately, with added components required as countermeasures against noise on the signal lines between the ICs and, because freedom to change the configuration to suit the application is required, fabrication usually does not include the peripheral ICs.

In addition, because of this configuration, it is difficult to perform high-speed input and output for data capture. For example, the A/D converter used is generally a 10 bit successive approximation type and the time required for A/D conversion of this successive-approximation type converter is 0.2 to 0.3 ms. For this reason, when inputting converted data, if other interrupts occur, the next data might need to be sampled before the interrupt processing has been completed, thereby hindering the achievement of the required number of data inputs in the given time period.

The use of individual devices requires signal lines for each of the ICs and involves a considerable board area not only for parts, but for wiring as well. In addition not only does the large amount of wiring requires a large number of pins on the microcomputer, but individual programs are required adding to the complexity. Furthermore, another problem is that of the effect on the required control of delay in the processing of each of the separate programs.

SUMMARY OF THE INVENTION

The object of the present invention is to improve on the defects of the above-described prior art, and to provide an input/output processing apparatus and input/output method capable of compact implementation, which, in a general processing and control system, provides efficient computer control, including that of electrical actuators in a vehicle, based on multidimensional information.

To achieve the above-stated object, the present invention basically uses the following engineering constitution. Specifically, the first form of the present invention is an input/output processing IC which is connected to a control microcomputer and which, in accordance with a program, inputs various electrical signals and outputs processing results status data and command values, this input/output processing IC comprising:

an input means which accepts the above-mentioned electrical signals;

an output means which outputs above-mentioned status data and command values; and a serial communications means which performs sending and receiving of above-mentioned input/output data to the microcomputer.

The second form of the present invention is an input/output processing method which includes a microcomputer used for control and an input/output processing IC connected to the microcomputer, and which, according to a program, accepts various electrical signals and outputs processing results instruction data and command values, wherein the required high-speed parallel input/output processing is interrupted by means interrupt requests to the microcomputer by notification of the occurrence of events, and further wherein, with respect to inputs/outputs which do not require high-speed, serial communications are performed periodically with the above-mentioned microcomputer not only to receive data processing commands or output data, but also to send the above-mentioned signals.

In the present invention, the above-mentioned engineering constitution enables an implementation on only a single peripheral IC, thereby providing a savings of CPU connection pins and package pins in comparison with previous configurations using separate ICs, and in addition it enables IC selection with a single timing and the acquisition of each data with the same program, thus reducing waste in programming. In addition, data which requires high-speed access is captured in parallel, and data which does not require high speed is captured in parallel, and data which does not require high speed is captured in serial, enabling the optimal data processing with a small amount of waste.

BRIEF DESCRIPTION OF THE DRAWINGS

FIG. 8 shows the flow of shift register processing in the serial communications block.

FIG. 10(A) and FIG. 10(B) are flowcharts which shows the timer routine every 2 ms in the CPU communications processing.

DETAILED DESCRIPTION OF THE PREFERRED EMBODIMENT

Figure 1:
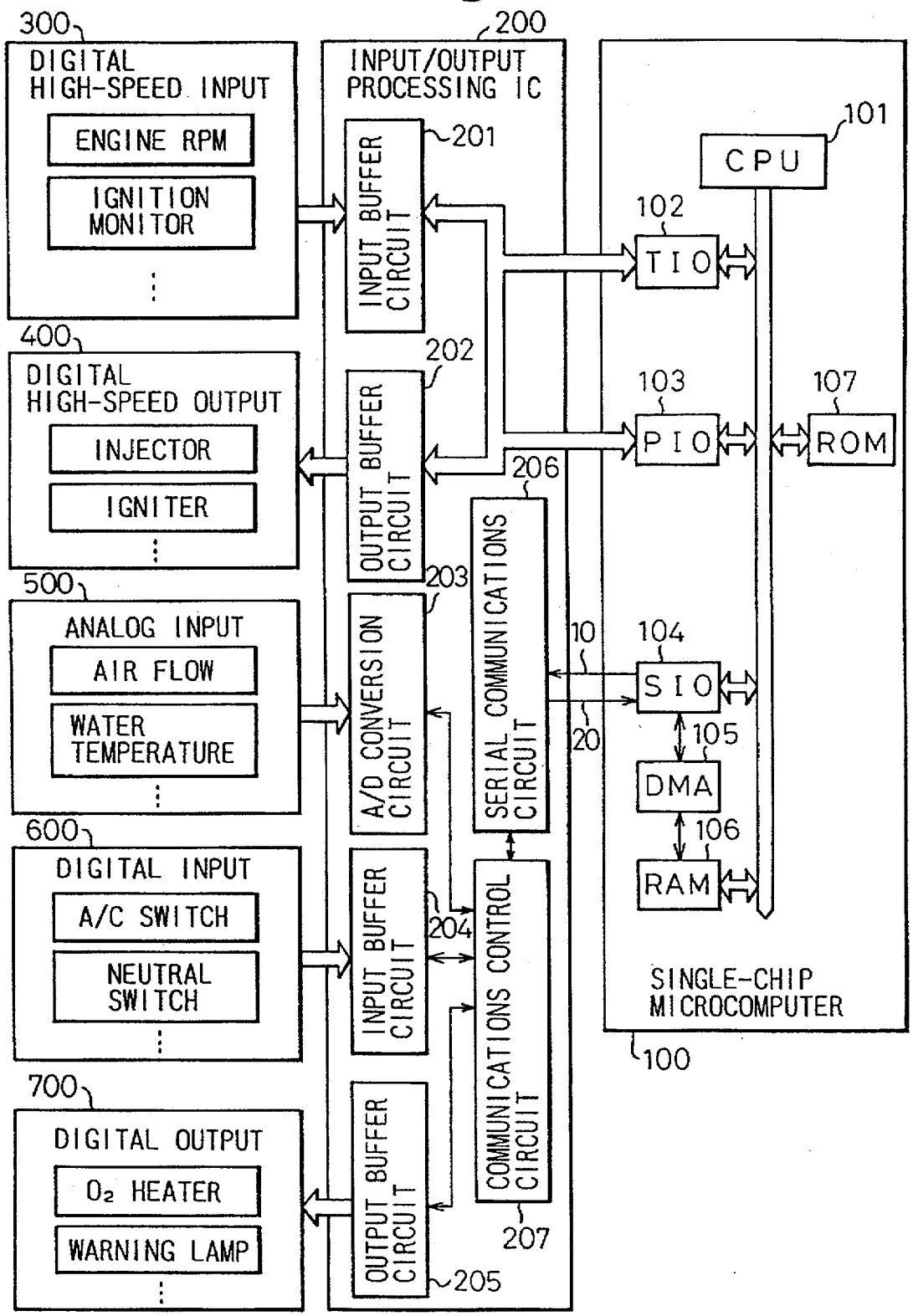
FIG. 1 is the block diagram of an ECU used for vehicle engine control, which is implemented with the input/output processing IC of one embodiment of the present invention.

The following is a detailed description of actual examples of the input/output processing IC and input/output processing method according to the present invention, with reference made to the drawings.

The first actual example of the first form of the present invention is an input/output processing IC which is connected to a microcomputer used for general electronic control of elements such as electrical actuators and which, in accordance with a program, accepts various electrical signals and outputs processing results, status data and command values. This input/output processing IC comprising an input means which accepts the above-mentioned electrical signals, an output means which outputs the above-mentioned status data and command and values, a conversion means which performs parallel/serial conversion of the input/output data handled by the above-mentioned input means and output means, and a serial communications means which performs sending and receiving of the above-mentioned input/output data to the microcomputer.

In the second form of this first example of the present invention, the above-mentioned serial communications means is executed by means of handshaking between the microcomputer and the input/output processing IC. More specifically, a bi-directional send/receive serial communications data buffer is a shift register connected in a loop so as to shift the upper-order bit of each register with the other register's lower-order bit, so that simultaneously with the receipt of bit-shifted instruction data or output data from the microcomputer, the input data at the above-mentioned input/output processing IC is bit-shifted and sent to the microcomputer. In sum, this serial communications means shifts bits by precisely the length of the shift register.

The first example of the second form of the present invention is an input/output processing method which includes a microcomputer used for control, including control of vehicle electrical actuators, and an input/output processing IC connected to the microcomputer which, according to a program, accepts various electrical signals and outputs processing results instruction data and command values. The required high-speed parallel input/output processing is interrupted by means interrupt requests to the microcomputer by notification of the occurrence of events, and, with respect to input/output which does not require high speed, serial communications is performed periodically with the above-mentioned microcomputer not only to receive data processing commands or output data, but also to send the above-mentioned input electrical signals.

In the second example of the second form of the present invention, the above-mentioned serial communications means is executed by means of handshaking between the microcomputer and the input/output processing IC. More specifically, a bi-directional send/receive serial communications data buffer is a shift register connected in a loop, so as to shift the upper-order bit of each register to the other register's lower-order bit, so that simultaneously with the receipt of bit-shifted instruction data or output data from the microcomputer, the input data at the above-mentioned input/ output processing IC is bit-shifted and sent to the microcomputer, so that this serial communications means shifts bits by precisely the length of the shift register. In addition, a further related invention is a processing method constituted so as to transfer serial communications data directly to RAM via the microcomputer SIO and DMA.

A third example of the first form of the present invention is a third related invention, configured so as to be an input/output processing IC which is connected to a microcomputer used for control of various electrical actuators of a vehicle and to various vehicle sensors. The input/output processing IC performs input processing of the signals from the above-mentioned sensors, this input/output processing IC comprising an input means which inputs the electrical signals from the above-mentioned sensors, a parallel communications means for high-speed processing of some of the signals obtained, via the above-mentioned input means, by the above-mentioned microcomputer, a conversion means which converts, to serial signals, the remaining signals obtained by the above-mentioned input means, and a serial communications means which supplies the serial signals obtained by the above-mentioned means to the above-mentioned microcomputer.

In addition, a fourth actual example of the first form of the present invention is the third related invention, the configuration of which is such that the above-mentioned microcomputer is used for engine control, and the above-mentioned part of the signals supplied to the above-mentioned microcomputer by the above-mentioned parallel communications means are signals generated in synchronization with the rotation of the engine.

By virtue of the above-mentioned configuration of the input/output processing IC of the present invention, regarding the parallel input signals which require high-speed access, it is possible, for example, to use a signal which is generated asynchronously as a trigger signal to generate an interrupt request with respect to the CPU, The CPU treats this in a program, as the occurrence of an event, performing priority input processing of parallel input data and processing necessary for engine control, with the processing results output to the input/output processing IC as parallel data if necessary. Data input to the input/output processing IC from sensors or other elements which do not require high-speed access is sent at the prescribed interval as serial data in open time periods during which parallel processing is not being performed. For example, the data may be sent to RAM via the SIO or DMA of the CPU. The CPU performs the processing required for engine control based on these data, and issues commands to actuators and other elements by means of serial communications. In serial communications, when instruction data or output data is received from the SIO, input/output processing IC input data is sent. Data received from the CPU is processed in accordance with commands, and if it is output data, it is converted to parallel data in the output buffer and then output. If there is an A/D converter in the input section, channel data will be added to the input data. Channel commands are also given in the case of input commands to the A/D converter.

What follows is a description of the present invention based on the embodiments.

[Embodiment 1]

FIG. 1 is the block diagram of an ECU (electronic control unit) used in a vehicle engine, comprising a one-chip microcomputer 100 which forms the heart of the microcomputer, IC 200, which is the input/output processing IC of the embodiment of the present invention, to which digital high-speed input 300, which serves as input/output from sensors and switches to actuators, digital high-speed output 400, analog input 500, digital input 600, and digital output 700 are connected. The one-chip microcomputer 100 comprises CPU 101, ROM 107, RAM 107, and in addition TIO (timer input/output) and PIO (parallel input/output) 103 which receives parallel data, SIO (serial input/output) 104 which performs data transfer, and DMA 105 which transfers serial data to RAM 106. The parallel signals of the input/output processing IC are connected from the high-speed input buffer 201 and high-speed output buffer 202 to TIO 102 and PIO 103, and serial signals are connected from communications control circuit 207 through serial communications circuit 206 to SIO 104. Serial communications circuit 206 and SIO 104 each have shift registers, which are a loop so that the first bit of each shift register is connected to the last bit of the other shift register. The communications control circuit 207 is connected to the A/D conversion circuit 203, the input buffer 204, and the output buffer 205.

Signals from the digital high-speed input 300 include the engine rpm, ignition monitor, and knock signals, and signals to the digital high-speed output 400 include the injector drive signal and the ignition signal. The signals requiring high-speed conversion are mainly signals related to the engine's rotating condition. As necessary, signals such as the analog sensor signals for water temperature, oil temperature and air flow are input to the analog input 500. Signals from the digital input 600 include the neutral switch air conditioner switch signals, and signals to the digital output 700 include the warning lamp and $O_2$ sensor heater signals.

In addition, in defining what constitutes high speed, since the engine is what is being controlled, and the operation of it is mainly by a human, it is possible to say that the ECU is in the range in which there is no real influence control at high and low speed in comparison with engine operation. In general, low speed is in the order of a millisecond and high speed is in the order of a microsecond. In comparison with this, although the processing speed of a microcomputer can be said to be sufficiently fast, speed depends upon the amount of processing program code the actual time in which the desired input/output is executed and is often in the order of a millisecond. When there is a particularly large amount of processing to perform, the CPU is no longer capable of performing all processing simultaneously and must perform processing in serial fashion, so that if a further interrupt processing is set, the processing can be delayed even further. This is the reason why refinements in input/output processing were desired.

Figure 2:
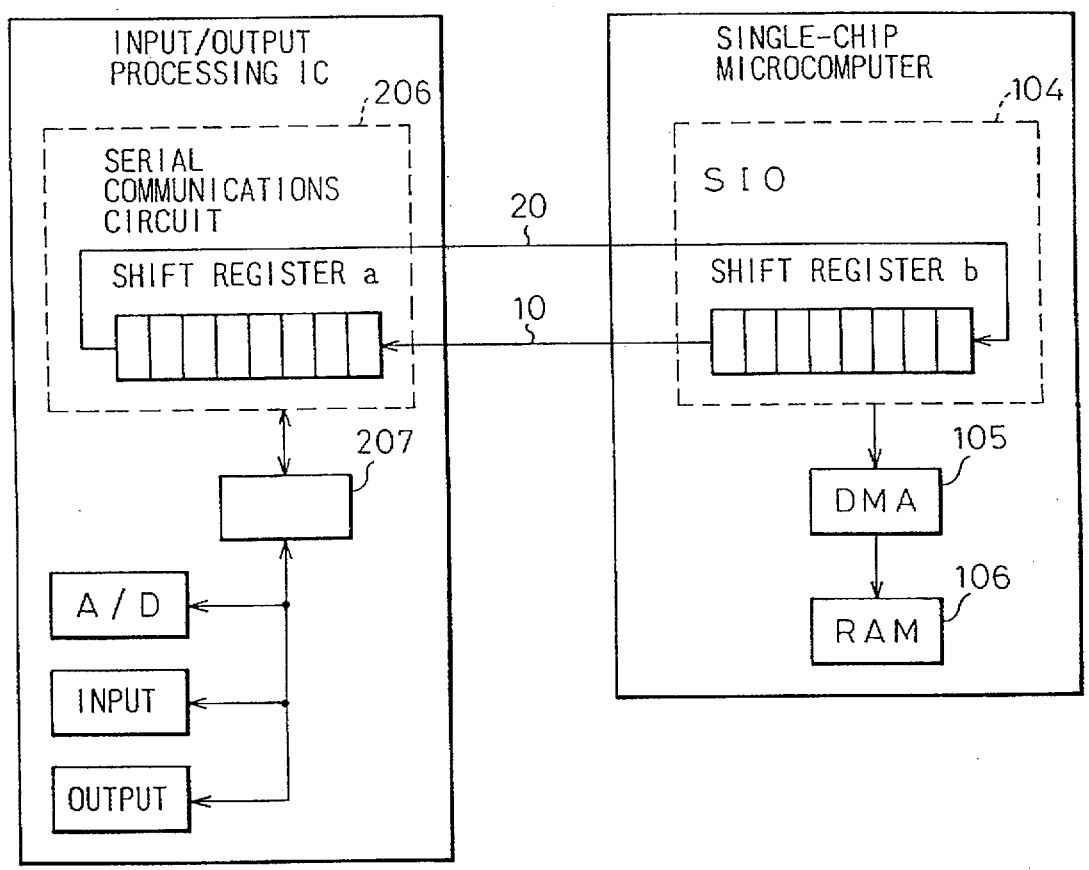
FIG. 2 shows the configuration of the serial communications means of this embodiment of the present invention.

For serial communications, as shown in FIG. 2, serial communications circuit 206 is provided with shift register a, which is connected to the shift register b provided at the microcomputer SIO thus forming a loop (serial lines 10 and 20). For this reason, when data transfer is performed, at one clock pulse the first bit of microcomputer shift register b is transferred to the last bit of shift register a at the serial communications circuit 206, simultaneously with which the first bit data of shift register a of the serial communications circuit 206 is moved to the last bit of shift register b of the microcomputer SIO. This shifting is repeated as many times as the bit length of the shift resisters (for 8 bits in the case of FIG. 2), at which point one serial communication is completed. Therefore, because instruction data and input/output processing IC data are switched simultaneously data is transferred with high efficiency. The input instruction data sent from SIO 104 is sent via communications control circuit 207 to the various ports, the data is latched and converted to serial data, and then the data is passed back via communications control circuit 207 so that the input data is transferred to shift register a of the serial communications circuit 206.

Because the digital high-speed input 300 is constantly accepting the changing engine data if this data is not simultaneously captured, it will not be possible to achieve proper engine control. For this reason, the engine-system signals are input as parallel data to the CPU with as many input pins as there are signals by using parallel communications. Triggers from each required input are used as interrupts for the PIO or TIO.

The analog input 500, since signals are always present at its input terminals, latches analog data by selecting the channel in accordance with commands from the CPU, converting the data to serial data and sending it to the microcomputer at the next serial transfer. The digital input 600 latches the status of each of the current bits in parallel according to commands from the CPU, converting them to serial and returning them. In addition, in serial communications, because only one piece of data can be sent at a time, it is not possible to send a command and data simultaneously by serial transfer. Therefore, if a command is received, it is sent on the next serial transfer cycle.

Figure 3:
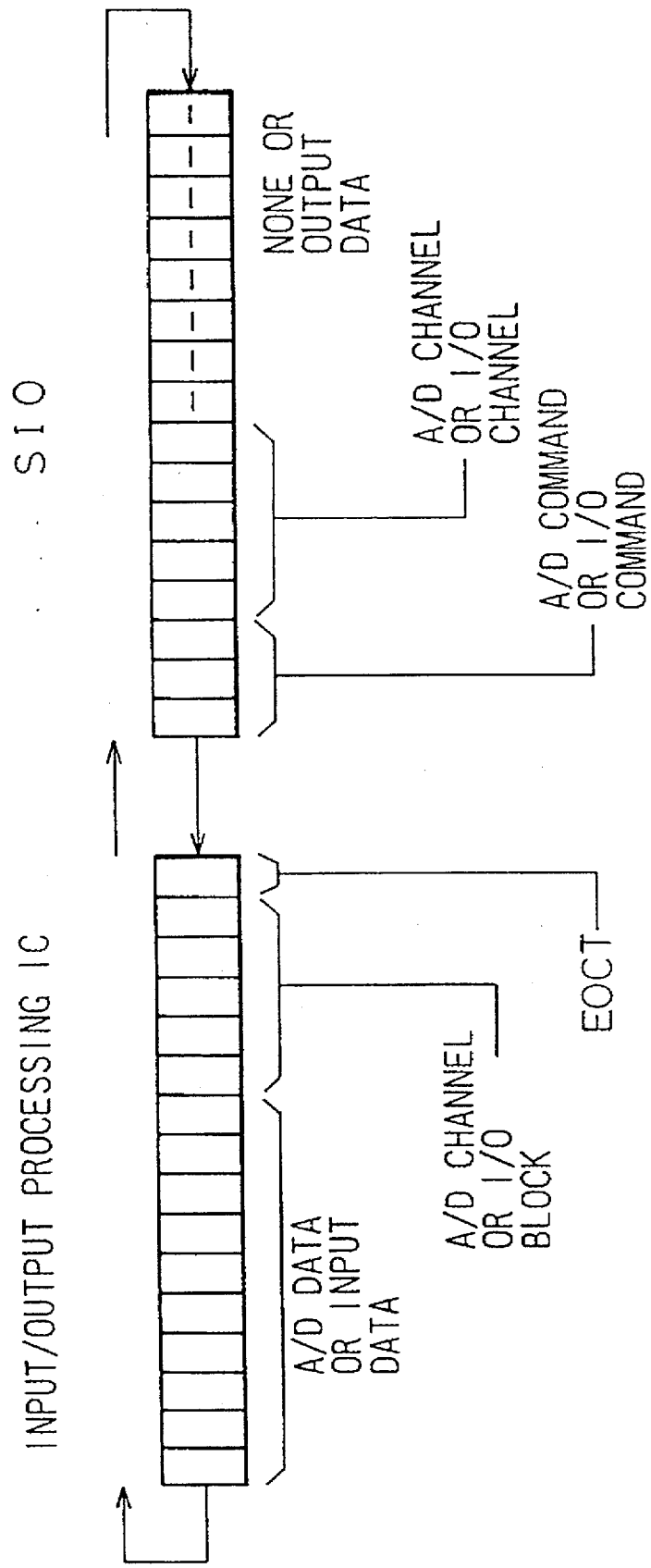
FIG. 3 shows the command format of the shift registers used to perform serial communications.

With regard to the serial communications in the present invention, an example of the CPU command from SIO 104 will be described. In FIG. 3, the case in which serial communications are performed with 16-bit shift registers is shown. The first three bits at the CPU side are loaded with an A/D command or I/O command, and the five bits are loaded with A/D channel-selection data or I/O block selection data. At the input/output processing IC, the results data the previous A/D conversion or input data is set into the shift register. The reason for outputting the A/D conversion channel, I/O block, or EOCT together with data is to perform data check at the CPU, enabling a check to be performed against the command that was output by the CPU. EOCT is data that indicates whether or not the input/output IC has prepared data normally. A shift clock of 16 bits length is output from the CPU, this causing the CPU SIO data to be swapped with the data of the input/output processing IC. The first data which is output simultaneously with the command input from the CPU is ignored by the CPU, which treats it as dummy data.

Figure 4:
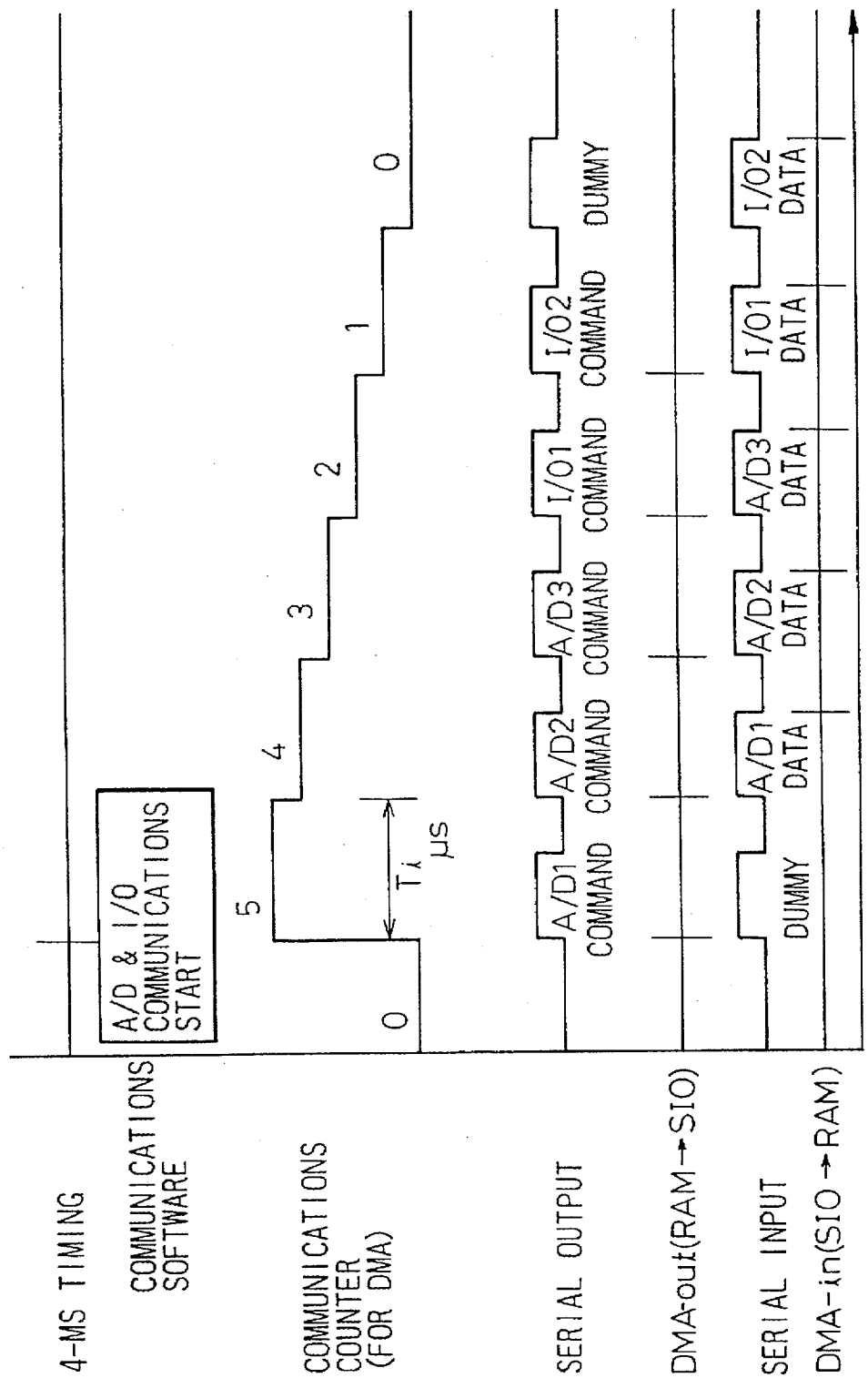
FIG. 4 is a timing diagram which shows an example of data input/output.

The flow of the sequence of processing CPU input/output data is as shown in the timing diagram of FIG. 4. With respect to the communications processing for A/D conversion and digital input/output signal processing that does not require high-speed access, a 4-ms timer intercept is issued to perform input processing. In FIG. 4, the example of three channels of A/D conversion and two channels of I/O, a total of 5 channels or serial communications is shown.

This microcomputer, which has built-in DMA, first writes the first RAM address and the first RAM address for storage of the A/D conversion data and I/O data, which are stored in output data format (SIO data in FIG. 3), into the address register for DMA transfer. At the 4 ms interrupt, the number of times for data processing operations 5 is set into the communications counter and communications are started. The first output command (AD1) from the DMA-out is transferred from RAM to the SIO, and serially output. Although, serial input data is input from the IC simultaneously with this output, this data is ignored as dummy data. Then, each Ti μs this processing is sequentially repeated. Finally, when dummy data is output for the purpose of capturing data and the last data (I/O2) is captured into the RAM, this sequence of communications processing is completed. When the next 4-ms interrupt is generated, the sequence of communications processing is started once again. This is basically carried out without any relation to PIO and TIO high-speed input/output processing, and when communications are started by a 4-ms interrupt, independent DMA transfer with the CPU is performed.

The command format for serial communications is not restricted to the above, and can be designed as required according to the configuration of the IC (for example, the use of 4-bit commands). The parallel data section can be limited, as necessary, to either input or output, and the same applies to normal digital input/output, If necessary, D/A converted output can also be provided.

The input/output processing IC of the present invention combines several individual peripheral ICs into one, thereby combining data communications for input/output processing and enabling sending and receiving of data with just a few data lines. In addition, it is possible to perform simultaneous serial data sending and receiving, and to simultaneously capture both input commands and data and, by using DMA to perform direct transfer to memory without CPU intervention, lighten the burden on the CPU. Therefore, it is possible to reduce the number of pins on the package of the input/output processing IC, enabling not only the processing of a large amount of data with a limited number of pins, but also a reduction in the size of the program in the microcomputer connected to the input/output processing. The result is minimizing the delay in input/output data without the influence of software, and achieving both better control and a compact unit.

Further, although the above-described embodiment, is an input/output processing IC which performs both input and output processing, this invention can be applied to an input IC which processes input only, in which case the input IC is configured so that high-speed digital input is performed to the CPU in parallel via the input buffer, with other digital input and analog input being performed by serial communications circuits by DMA transfer. However, in this case, outputs are all made either directly from the microcomputer or via a serial/parallel conversion circuit.

In addition, in the configuration of FIG. 1, it is also possible to combine another configuration which either performs only digital high-speed output directly with the microcomputer, or performs digital output only via the serial/parallel conversion circuit with the microcomputer, using an input/output processing IC.

Next, an actual example of a method of the present invention of performing the data communications required between the input/output processing IC and the microcomputer will be described. As described above, the input/output processing IC of the present invention is connected to a microcomputer used for control, and comprises a shift register into which data to be sent and received between the above-mentioned microcomputer and itself is configured on a single IC, chip. Further, the input/output processing IC has a communications means which has at least an input buffer circuit and an output buffer circuit where output data is received as serial data into the above-mentioned shift register and output to the above-mentioned output buffer, and the input data input to the above-mentioned input buffer circuit is sent to the above-mentioned microcomputer as serial data via the above-mentioned shift register. One actual example of an input/output processing IC comprises a shift register that is connected to a microcomputer used for control which stores data which is sent to and received from the above-mentioned microcomputer, and a communications means which has at least an A/D converter and an output buffer circuit, which receives into the above-mentioned shift register serial data from the above-mentioned microcomputer commands and output data. When the above-mentioned instruction data is a command, the above-mentioned output data consists of the data bit of the A/D channel to which output is to be made and the data bits to be output to the above-mentioned output buffer. Further, when the above-mentioned instruction data is a command related to output, the above-mentioned instruction data consists of the data bits to be output to the above-mentioned output buffer.

An example of a communications method for data communications in the input/output processing IC of the present invention is the configuration having the above-mentioned input buffer circuit on a single-chip IC. Following the above-mentioned communications method, at the point at which the above-mentioned instruction data is received from the above-mentioned microcomputer, the data stream to be output to the above-mentioned microcomputer from the data stream (which includes A/D conversion data and the data input to the buffer circuit) is switched to the data stream which is only the input data and outputting this to the above-mentioned microcomputer.

Figure 5:
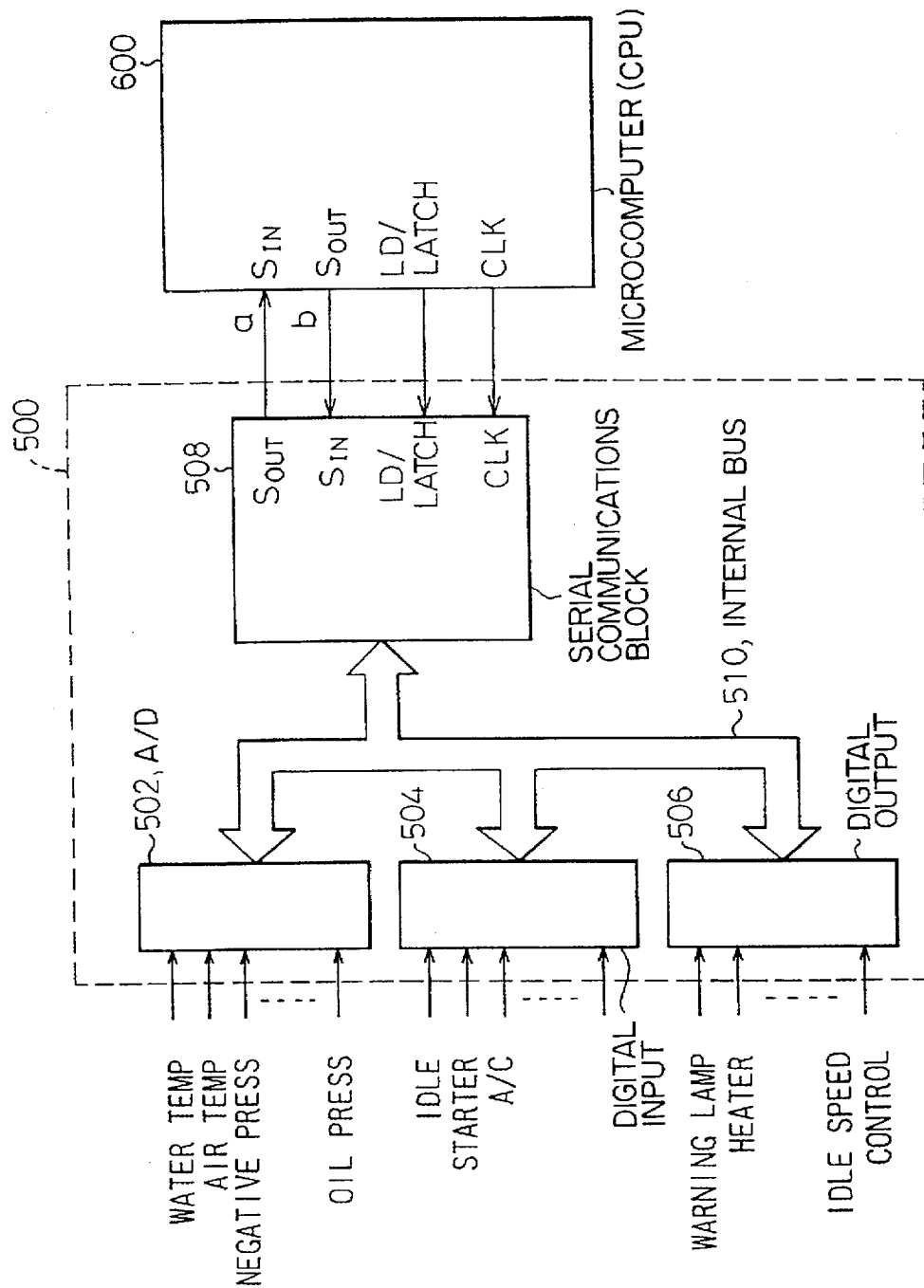
FIG 5 is a block diagram of an input/output processing IC of the present invention.

FIG. 5 shows an example of a circuit used to implement the above-mentioned communications method in which the input/output processing IC 500 includes the functions of the A/D converter 502, the digital input 504, and the digital output 506, and in which circuits that correspond to each of the functional elements are connected by means of an internal bus. The microcomputer 600 is connected by means of the four signal lines Sin, Sout, CLK and LD/LATCH, the parallel data of each of the functional elements being transferred to the microcomputer 600 by means of the serial communications block 508. This embodiment is for engine control, with sensor signals such as water temperature, air temperature, and intake negative pressure input at the input terminals of the A/D converter 502. Signals such as the idle switch, starter switch, air conditioner switch are connected to the digital input 504, and signals such as the warning lamp signal, the heater signal, and the idle speed control signal are connected to the digital output 506.

Figure 6:
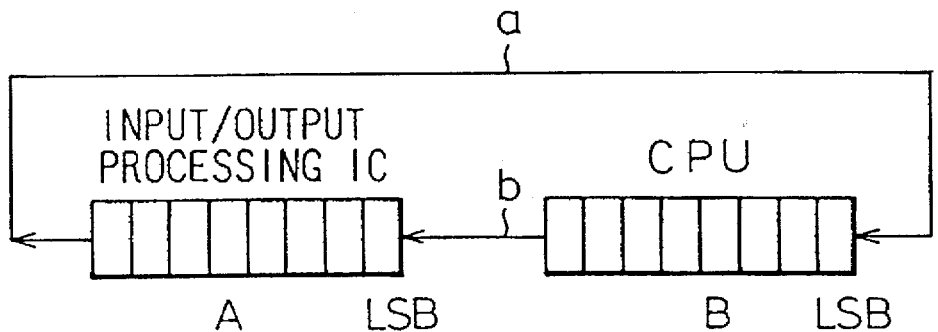
FIG. 6 shows the shift register relationship in the serial communications part.

In a configuration such as this, to perform, simultaneous parallel transfer of digital signals with the microcomputer, the following protocol is employed. That is, as shown in FIG. 6, shift registers A and B are provided at the input/output processing IC and microcomputer respectively, a loop circuit being formed between them, so that the shift destination of the upper-order bit is the LSB (least significant bit) of the other shift register. With this type of configuration, is not necessary to provide two shift registers for each of the serial data inputs and outputs, and it is possible to simultaneously receive both instruction data and input data. That is, as shown in the timing diagram of FIG. 7, at the point at which the microcomputer has prepared output data, the LD/LATCH line is changed from low to high, at which point (c in FIG. 7) the input/output processing IC 500 holds the input data, transfers it to the shift register A within the serial communications block, and with the next clock data is transferred from the Sout as serial data to the input terminal Sin of the shift register B of the microcomputer. Simultaneously with this, the microcomputer, according to the same clock, serially converted data is transferred to the input terminal Sin of the shift register A of the input/output processing IC 500 from the output terminal Sout of the shift register B of the microcomputer. The process is completed when this has happened a number of times equal to the shift register bit length (in this case 8 bits), which point the LD/LATCH line is changed from high to low, at which point (d in FIG. 7) the output data that had been received by the input/output processing IC 500 is transferred from shift register A to the digital output block 506, becoming a new output and completing one serial transfer sequence.

Figure 7:
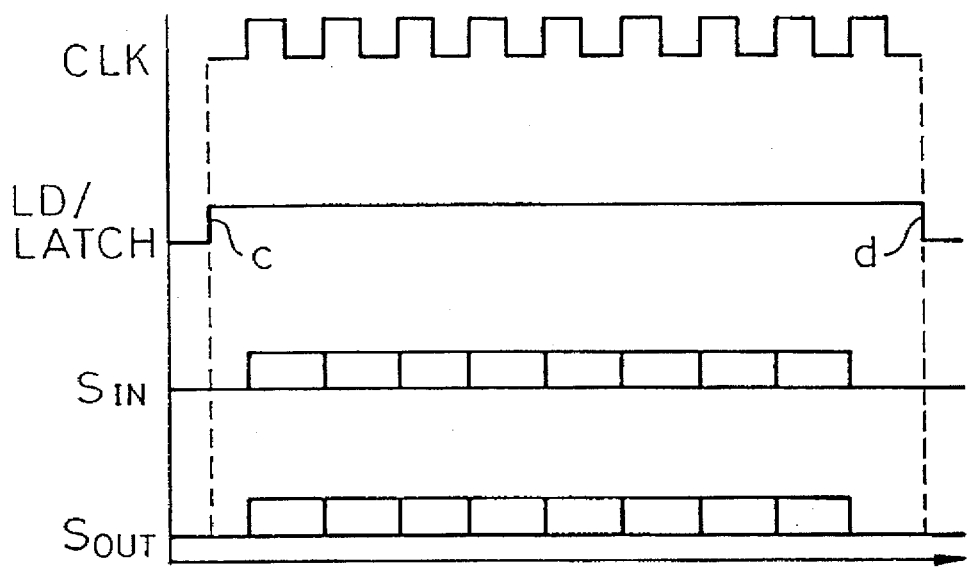
FIG. 7 is a timing diagram of serial communications.

FIG. 8 describes the above processing operations in terms of the shift registers where the input data which is readied at the digital input buffer is captured by the shift register A within the serial communications block of input/output processing IC 500 at point c of FIG. 7. The captured input data is bit-shifted according to the block signal to serially transfer it. Input data is sent to the shift register B of the microcomputer while LSB output data, etc. are set by means of communications line b. when the transfer is completed, the output data set into shift register A at point d in FIG. 7 is sent to the buffer of the digital output 506.

Figure 9A:
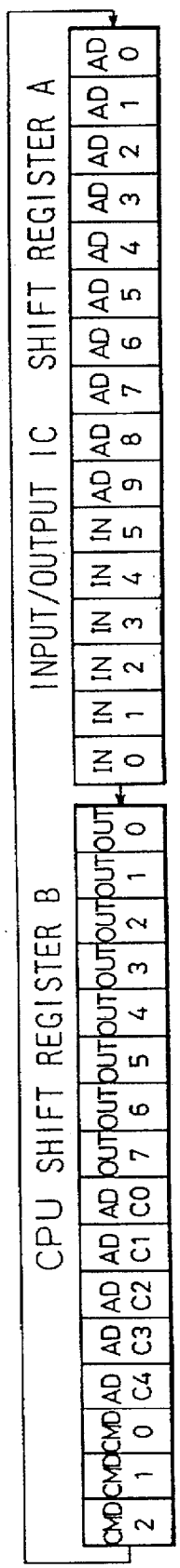
FIG. 9(A) to FIG. 9(D) show the data exchange relationships in serial communications by means of the shift registers.

In the case of A/D Conversion, to preserve data accuracy it is necessary to have a certain number of digitizing bits. This will be explained, for the example, for the 10-bit A/D conversion shown in FIG. 9. In this case, each of the shift registers has 16 bits. In FIG. 9(A), an A/D conversion command is set into the first 3 bits as instruction data for the microcomputer, the following 5 bits being used to select the A/D channel (5 bits=selection from 32 channels). The remaining 8 bits are loaded with digital output data. With regard to A/D conversion, because the conversion is performed after the command for the specified channel is sent from the microcomputer, the data obtained at that command is sent to the microcomputer on the following step. And because of this, at the start of the sent data there is a command that calls for an A/D conversion, the command being followed by bits which specify the channel.

Figure 9B:
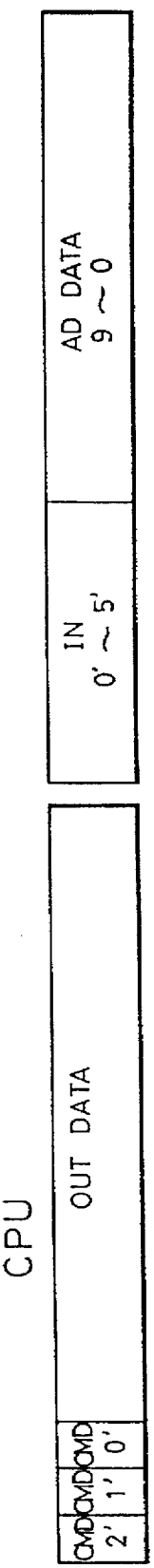
Figure 9C:
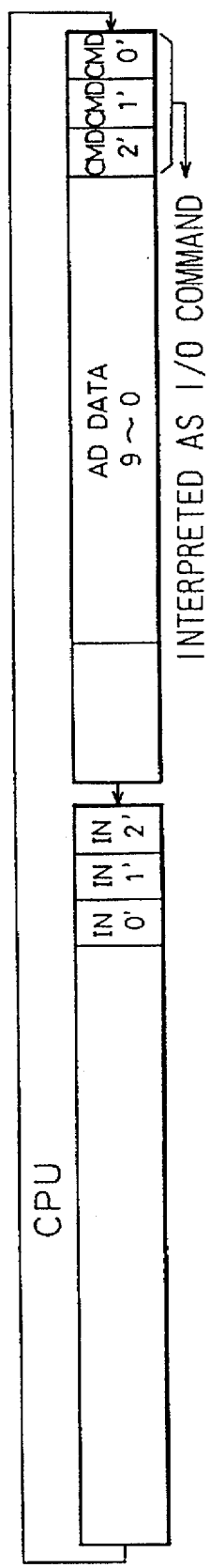
Figure 9D:
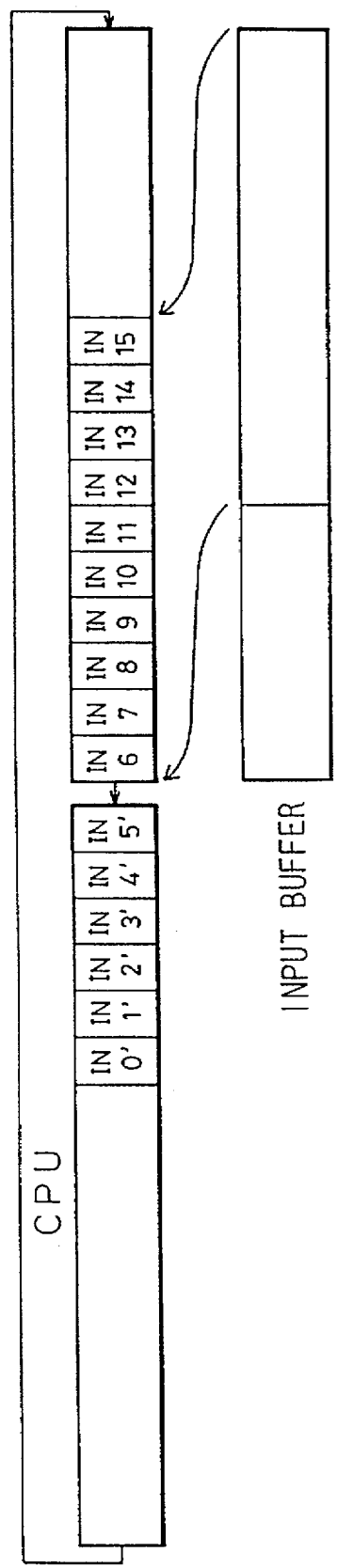

Since it is possible to distinguish from the first 3 bits sent whether the command sent is an A/D conversion command or input instruction, the A/D conversion data and 6 input data are set into shift register A beforehand (FIG. 9(B)) and then transfer is started. The command is then shifted in, and at the point at which it is judged to be an input command (FIG. 9(C)), since the A/D conversion data is unnecessary, it is possible to switch to input data midway. In this case, after sending the 6 bits of preset data to the microcomputer, the A/D conversion data is swapped with input data (FIG. 9(D)). The added input data consists of 10 bits, so that, in combination with the first 6 bits that were sent, there are a total of 16 bits of input data sent. In this case, since the first 6 bits are always sent even in the case of a command, it is possible to improve utilization efficiency by assigning the most essential data to these bits. In such as system as this, depending on the type of microcomputer, it is possible to switch freely the number of input points.

The CPU routine in the case of this A/D conversion is processed as shown in the flowchart shown in FIG. 10(B). It is necessary to perform this input/output processing periodically, and this is implemented by, for example, a 2-ms timer routine. FIG. 10(A) shows the prior art, in which separate individual input/output ICs were used, wherein each of the input and output proceedings have steps 602, 606, 608, and 612 which control their control signals (LD/LATCH), and wherein before this sequence of processing is performed, the specified A/D conversion data is captured, after which serial transfer processing is performed, and then finally the A/D conversion instruction is given, as shown in this flowchart. Because of this, the number of program lines grew, thereby requiring more processing time. In contrast, with the configuration of the present invention as shown in FIG. 10 (B), because the control signals are all processed at one time (steps 700 and 704), with a single input/output process as part of serial processing. All of these steps are possible with step 702 alone, thus also providing a reduction in processing time. Thus, the reduction in number of processing steps reduces the possibilities of timing jamups in program execution, thereby assuring more reliable operation.

Figure 11:
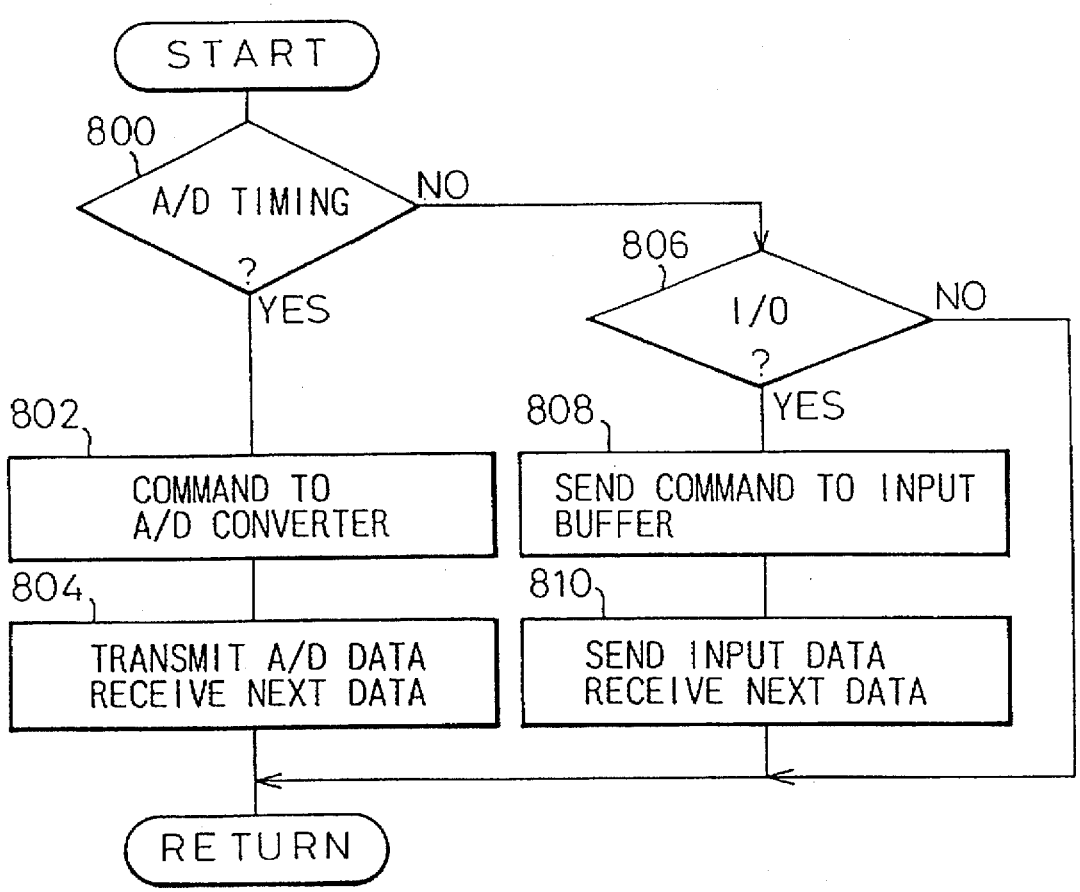
FIG. 11 is a flowchart which shows the timer routing in the case in which there is an A/D converter.
Figure 12:
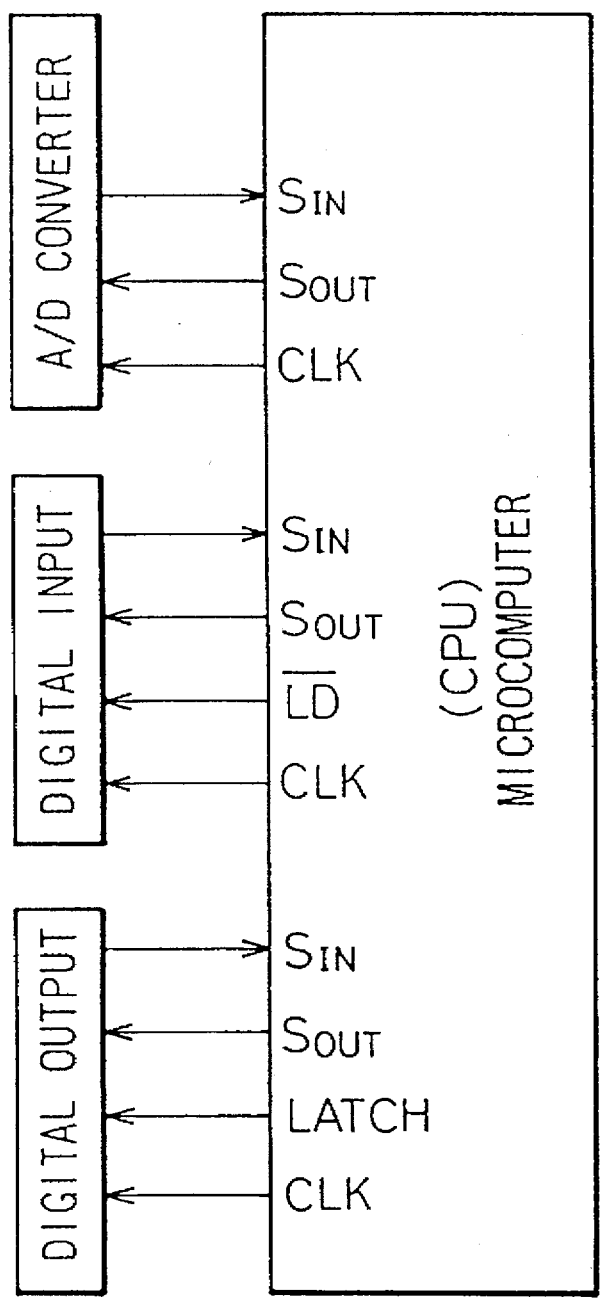
FIG. 12 is a block diagram of a previous input/out processing unit.

With regard to processing performed at the input/output processing IC, the flowchart including an A/D conversion in the command of the instruction data from the CPU is shown in FIG. 11. At step 800 a judgment is made as to whether the first 3 bits are an A/D conversion or input/output, and if they are an A/D conversion the command is transferred as is at step 802 to the A/D converter, after which at step 804 A/D conversion data is sent, after which and preparation is made for the next A/D conversion processing. In the shift register configuration example shown in FIG. 9, since the A/D command is 3 bits and the specified channel is 5 bits, when 8 bits have been sent data sampling is possible. Since the already input data which is simultaneously sent is also 8 bits, because there are 10 A/D conversion bits, 2 bits of A/D conversion data have already been sent. For this reason, the A/D conversion data that has been sent is the data for the immediately previous command. If the previously sent 3 bit command is an input instruction, processing jumps to step 806, where the command is sent to the input buffer, and then to step 810, where the same type of input/output processing is performed as at step 804. This flowchart can be software implemented by using ROMs within the chip, or hardware implemented by using logic elements.

As described above, using the input/output processing IC according to the present invention, it is possible to implement extremely smart input/output processing, enabling a streamlined hardware configuration, thereby resulting in an extremely compact device. From the standpoint of the CPU as well, because the number of signal lines required is small, it is possible at the design stage to free up pins which have been previously tied up to other functions, thereby contributing to an improvement in CPU performance.

in the present invention, parallel data from each functional IC such as A/D converters is transferred to the microcomputer by means of a serial communications block via an internal bus, using only a very few signal lines, by simultaneously swapping instructions from the microcomputer and data from the peripheral ICs. Because this is implemented on a single chip, it is possible for a single routine at the microcomputer to switch commands, thereby enabling the execution of data communications with a short program.

In addition, because the peripheral ICs are combined and the number of signal lines is reduced, the amount of board space required is reduced, thereby achieving a reduction of hardware size. Further, it is possible to perform transfer of a large variety of data over just a few serial lines, thereby simplifying the inclusion of this device as part of another device. It also provides freedom in design of the CPU. Because the CPU program is shortened and the processing time is shortened, wasted execution time is eliminated, thereby improving the effectiveness of utilization in control functions.

We claim:

1. An input/output processing IC and a control microcomputer, said input/output processing IC being connected to said control microcomputer and inputting various electrical signals to said control microcomputer and outputting processing results, status data and command values in accordance with a program from said control microcomputer, comprising:

input means for inputting said electrical signals;

output means for outputting said status data and said command values;

conversion means for performing parallel-to-serial conversion of input/output data handled by said input means and said output means; and serial communication means for sending and receiving said input/output data with said microcomputer, wherein said serial communication means has a send/receive serial communications data buffer including two serial shift registers, one of said serial shift registers mounted in said control microcomputer and the other of said serial shift registers mounted in said input/output processing IC, said serial shift registers being connected in the form of a loop such that an upper-order bit of each shift register is connected to a lower-order bit of the other shift register, and instruction data and output data from the microcomputer are bit-shift received simultaneously as the input data at said input/output processing IC are bit-shift sent to the microcomputer, so that said communication means performs bit shifts of the bit length of said shift registers.

2. An input/output processing IC according to claim 1, wherein said input/output processing IC is used for control of electrical actuators of a vehicle.

3. An input/output processing IC according to claim 2, further comprising a parallel input/output means for performing high-speed processing.

4. An input/output processing IC according to claim 1, wherein an input buffer circuit and an output buffer circuit are configured on a single-chip IC.

5. An input/output processing IC according to claim 1, which further provided with a shift register that is connected to the control microcomputer, and in which is stored data sent to and received from said microcomputer.

6. An input/output processing IC according to claim 5 or 4, which is further provided with A/D conversion means on the IC chip, and which further comprises communications means which receives instruction data and output data from said microcomputer as serial data to said shift register, and wherein in the case in which said instruction data is a command with respect to said A/D conversion means, said output data consists of data bits for the A/D channel which is to be sent to and the data bits to be sent to said output buffer circuit, and wherein in the case in which said instruction data is a command related to output, said output data consists of data bits to be output to said output buffer circuit.

7. An input/output processing IC according to claim 6, which comprises an input buffer circuit on a single-chip IC, and wherein, if at the point at which said instruction data is received from said microcomputer said communications means judges said data to be an input/output related command, the data stream to be output to the said microcomputer is switched from the data stream which includes A/D conversion data and the data input to the buffer circuit to the data stream which is only the input data, bit-shift outputting this to the said microcomputer.

8. An input/output processing method controlled by a microcomputer and using an input/output processing IC connected to the microcomputer which accepts various electrical signals as inputs and outputs processing results, instruction data, and command values according to a program, the method comprising:

performing periodic serial communications with said microcomputer when input/output processing does not require high speed, said serial communications being performed to receive data processing commands or output data and to send said input electrical signals, said serial communications being conducted by two shift registers, one of said shift registers mounted in said control microcomputer and the other of said serial shift registers mounted in said input/output processing IC, said serial shift registers being connected in loop form and:

performing handshake sending of serial data of said input/output processing IC using serial data received from said microcomputer;

shifting an upper-order bit of each shift register to a lower-order bit of the other shift register such that instruction data and output data from said microcomputer is bit-shift received; and simultaneously bit-shift sending input data of said input/output processing IC to said microcomputer wherein the bits are shifted by a number of bits equal to the shift register length; and sending interrupt requests to said microcomputer when high-speed parallel input/output processing is required for control, said interrupt requests being sent to notify the microcomputer of the occurrence of events.

9. An input/output method according to claim 8, wherein said serial communications data is directly transferred to RAM via the SIO and DMA of said microcomputer.

10. An input/output processing IC connected to a vehicle sensor and a microcomputer connected to said input/output processing IC used for electrical control of a variety of electrical actuators of a vehicle, wherein said input/output processing IC and said microcomputer performs input and output processing of said vehicle sensor, comprising:

input means for inputting an electrical signal from said vehicle sensor;

parallel means for high-speed processing of some of the signals obtained by said input means and for supplying said signals to said microcomputer;

conversion means for converting the remaining signals obtained by said input means and not processed by said parallel means to serial signals;

serial communication means which supplies the serial signals obtained by said conversion means to said microcomputer, the signals supplied to said microcomputer being generated in synchronization with engine rotation, wherein said serial communications means has a send/receive serial communications data buffer including two serial shift registers, one of said serial shift registers mounted in said microcomputer and the other of said serial shift registers mounted in said input/output processing IC, said serial shift registers being connected in the form of a loop such that an upper-order bit of each shift register is connected to a lower order bit of the other shift register, the instruction data and output data from the microcomputer being bit-shift received simultaneously as the input data at said input/output processing IC are bit-shift sent to the microcomputer, so that said communication means performs bit shifts of the bit length of said shift registers.

* * * * *